Jan. 21, 1930.  L. PRYCE  1,744,141
HAMMER ROCK DRILL
Filed Feb. 28, 1929
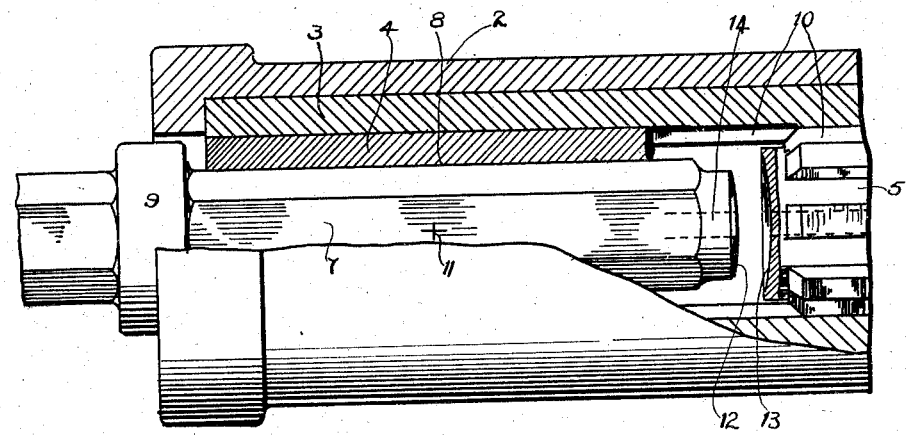
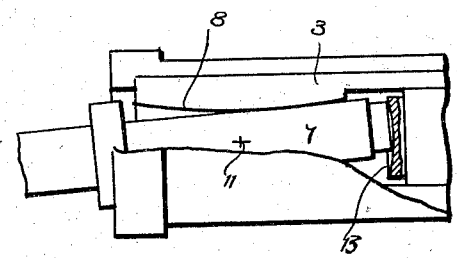
Inventor:
Leslie Pryce Patented Jan. 21, 1930

1,744,141

UNITED STATES PATENT OFFICE

LESLIE PRYCE, OF JOHANNESBURG, TRANSVAAL, SOUTH AFRICA

HAMMER ROCK DRILL

Application filed February 28, 1929. Serial No. 343,285.

The present invention relates to hammer rock drills and similar percussive apparatus in which a drill tool, loosely inserted in the chuck of the rock drill, is struck by a hammer piston either directly or through a tappet.

The object of the invention is to avoid damage to the contacting faces of the striking member and the tool. At the present time considerable damage is done to such faces as the result of the tool being out of alinement with the striking member and the impact consequently being transmitted through limited local areas of said faces.

The invention is illustrated in the accompanying drawings in which Fig. I is a conventional longitudinal section of the fore part of a rock drill and Fig. II is a similar but diagrammatic view illustrating the operation of the device with a worn chuck.

2 indicates the chuck casing in which the tool chuck 3 is mounted. As a rule said chuck is fitted with a renewable bushing 4.

5 is the member which strikes the drilling tool 6. Said member may be a tappet interposed between the hammer piston and the tool; but as illustrated and hereafter described it is the hammer piston itself, of which only the forward extremity is shown.

The tool has a shank 7 which seats loosely in the chuck bore 8, and a collar 9 or equivalent device for limiting its penetration into the chuck.

For the purpose of rotating the tool, in the case of a rock drill, the shank 7 and the bore 8 are made complementally polygonal; and the chuck is rotated, for example by means of the piston 5 which is itself rotated in well known ways and which communicates its rotation to the chuck through interengaging fluting 10.

In the use of rock drills as described the chuck bore 8 rapidly wears at its ends, which become bell-mouthed as shown exaggerated in Fig. II. The chuck accordingly fails to hold the tool accurately in alinement with the hammer piston, and it is found that the tool tends to gyrate about the point 11 on its axis midway between the ends of the chuck bore 8, so that the blow may be delivered when the tool is considerably tilted as suggested by Fig. II. If the hammer piston and the tool are formed with the usual flat faces, the result is that the blow is struck on an edge or corner of the tool end face 12, and the localized high stresses thereby set up damage both the tool end face and the end face 13 of the striking member.

According to this invention the end face 13 of the striking member is formed as a spherical depression the radius of which is approximately the distance between the point 11 and the end face 12 of the tool. It is desirable that this surface should be true within close limits and with that object it may be ground after the piston is hardened.

The tool end face is made of circular cross section with a circular periphery which, it will be evident, is a form capable of, at least, complete peripheral contact with the spherical surface 13 no matter how the tool axis is tilted relatively to the piston axis or what are the relative angular positions of the tool and the piston about their axes; which angular positions may become changed, for instance, when the parts of the drill are taken apart and reassembled.

In addition the tool end face 12 is made of convex form complemental to the concave spherical or like surface 13. In practice it is found desirable to form the cylindrical end 14 by turning it down from the polygonal bar in a lathe. It is convenient to machine the tool end face 12 in the same operation and to shape it as a cone the cross sectional contour of which approximates the two half chords of the arc representing the spherical surface 13 in section. The difference between the chords and the arc is minute, especially when the central area of the end face 11 is removed by the usual axial bore 14 provided in the tool for conveying water to its cutting end; and such difference is obliterated by the first few blows of the spherical hammer face 13 on the tool face.

The piston accordingly delivers its blow over the whole area of the end face 12 of the tool notwithstanding tilting of the tool as suggested by Fig. II, and irrespective of any change of position of the piston or tool angularly about the axis of the machine; damage to the contacting surfaces 12 and 13 being minimized correspondingly.

I claim:—

1. In a percussive apparatus, the combination of a tool chuck having a bore, a tool having a shank loosely seated in the bore, and a tool striking member having a spherically depressed striking face adapted to contact with the end face of the tool, said end face being peripherally circular and being convexly spherical complementally to the spherical surface of the striking member.

2. In a percussive apparatus, the combination of a tool chuck having a bore, a tool having a shank loosely seated in the bore, and having an end striking face which is peripherally circular and is convexly spherical, and a tool striking member having a striking face shaped concavely as part of a sphere centred on the axis of the member of a radius approximately equal to the distance between the centre of the chuck bore and the rear end of the tool.

3. In a percussive apparatus, the combination of a tool chuck having a bore, a tool having a shank loosely seated in the bore and a piston hammer having a spherically depressed tool striking face adapted to contact with the end face of the tool, said end face being peripherally circular and being convexly spherical complementally to the spherical surface of the striking member.

In testimony whereof I affix my signature.

LESLIE PRYCE.